INVENTOR
PETER CHARLES JACOBS
BY: Ernest Peter Johnson.
AGENT

May 19, 1970      P. C. JACOBS      3,512,773

CAPTIVE HELICOPTER APPARATUS

Filed Sept. 19, 1967      5 Sheets-Sheet 2

INVENTOR
PETER CHARLES JACOBS

BY: Ernest Peter Johnson

AGENT

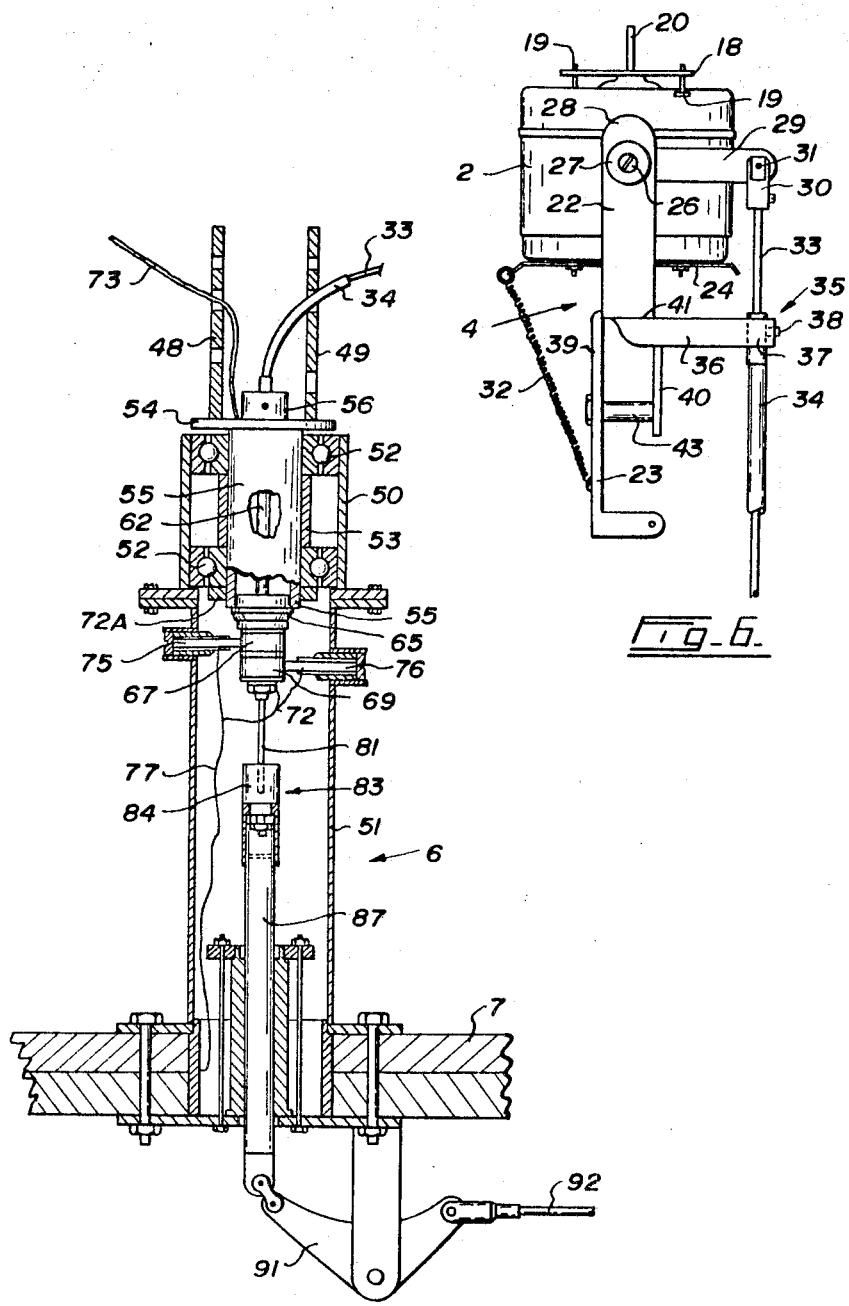

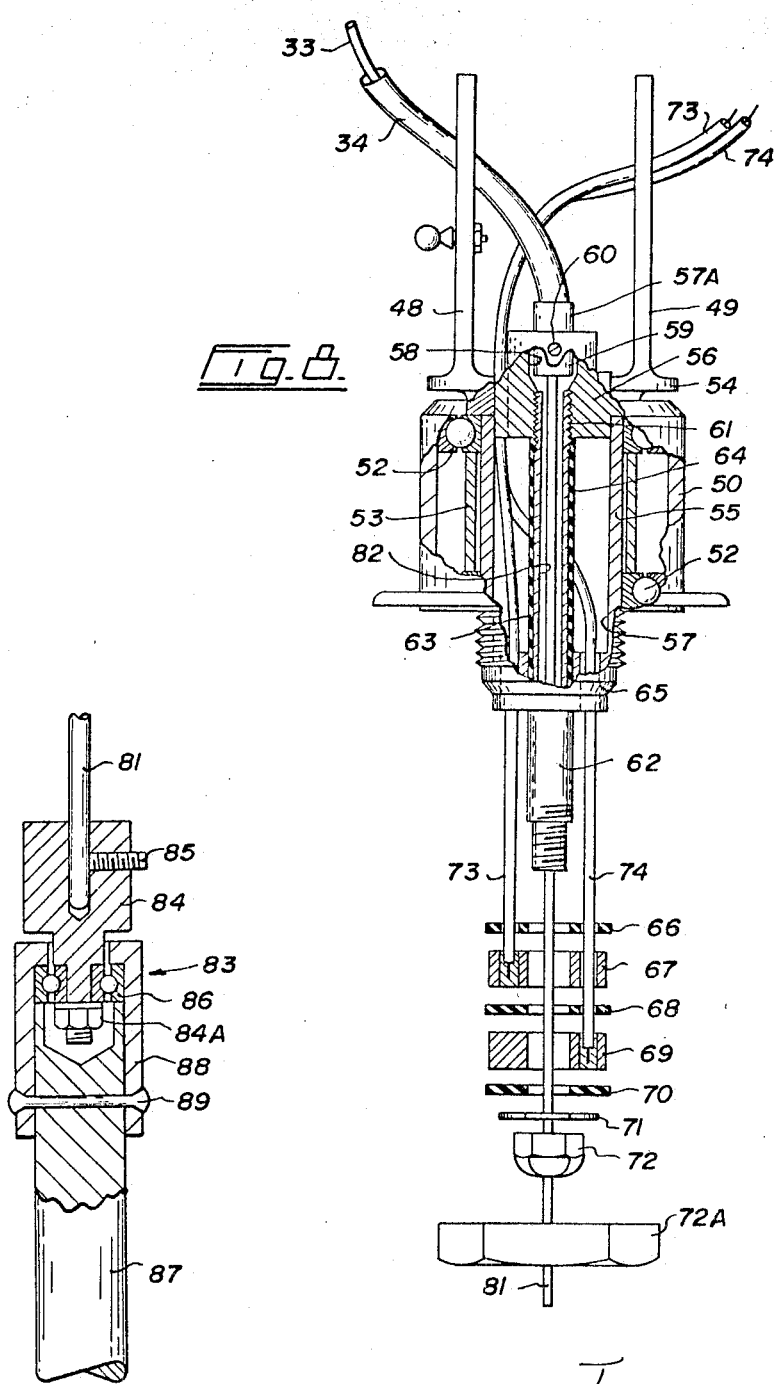

May 19, 1970     P. C. JACOBS     3,512,773

CAPTIVE HELICOPTER APPARATUS

Filed Sept. 19, 1967     5 Sheets-Sheet 5

INVENTOR
PETER CHARLES JACOBS
BY: Ernest Peter Johnson.
AGENT

United States Patent Office 3,512,773
Patented May 19, 1970

3,512,773
CAPTIVE HELICOPTER APPARATUS
Peter Charles Jacobs, Edmonton, Alberta, Canada, assignor to Jaycopter Corporation, Ltd., Edmonton, Alberta, Canada, a corporation of Canada
Filed Sept. 19, 1967, Ser. No. 668,868
Int. Cl. A63h 27/04
U.S. Cl. 272—31 2 Claims

ABSTRACT OF THE DISCLOSURE

A miniature, captive, powered helicopter is mounted on one end of a boom which in turn is rotatably pivoted on a pylon. The assembly is enclosed in a spherical plastic safety cover. The pivot point of the boom is coincident with the centre of the sphere; the helicopter is therefore always close to the inner surface of the cover, which results in an improvement in its responsiveness. Remote controls for varying the lifting power and attitude of the helicopter's rotor are provided whereby the helicopter may be made to simulate the flight of a conventional helicopter.

SUMMARY OF THE INVENTION

This invention relates to a captive, enclosed, powered helicopter adapted to be controlled in flight by a user from outside the enclosure.

The invention is directed toward providing an amusement device wherein a small, captive, powered helicopter, which is capable of simulating the flight of a conventional helicopter, is flown within a safety cover using controls operable from outside the cover. The control of the helicopter's take-off, flight, hovering and landing should be precise and yet involve the exercise of a considerable degree of coordination and skill by the user.

An assembly is provided which includes a small scale, powered helicopter fuselage, mounted on a boom, the boom being mounted on an upright pylon; these elements are at least partially enclosed in a safety cover. The fuselage is provided with a motor having a shaft connected to drive a main rotor. Rotation of the main rotor provides the propulsion necessary to fly the fuselage. The fuselage is pivotally mounted on the boom and is adapted to be tilted about a longitudinal axis parallel to the longitudinal axis of the fuselage so as to always maintain it in an upright position with relation to the ground, regardless of the disposition of the supporting boom. The boom is pivotally and rotatably mounted on the pylon. It can be pivoted to move up and down about a transverse axis. It will advantageously be mounted on the pylon intermediate its end and be equally balanced about its pylon pivot connection to reduce the motor power needed to fly the fuselage. The pylon will stand on a support member, and a cover member, such as a transparent plastic bubble, will at least partially enclose the pylon, boom and fuselage. As a result of this construction, the fuselage is maintained in an upright position and is free to move, within an enclosure, in a circular path about the pylon, as well as up and down in a slightly curved vertical plane.

Means are provided for altering the attitude of the main rotor from horizontal to control the flight and hovering of the fuselage. According to one embodiment, rotor attitude alteration may be achieved by pivotally mounting the fuselage on the bottom for tilting about a transverse axis and providing means, operable from outside the cover, which can be actuated to so tilt the fuselage. Such means will preferably comprise a mechanical linkage routed along the pylon and boom.

Means, operable from outside the cover, are also provided for varying the lifting power of the main rotor. This may be done in one of three alternative ways. In the particular embodiment described, means are provided for varying the speed of the motor which in turn varies the speed of the main rotor and alters its lifting power. Alternatively, means may be provided to vary the pitch of the rotor blades. In a third alternative, means adapted to vary both the speed and pitch may be provided. Only means for varying the motor speed are described herein since this would be the simplest, and therefore the likliest, embodiment which could be used. However, the alternatives are considered mechanical equivalents of the embodiment described and are considered within the scope of the invention.

In a preferred embodiment, a rounded cover is provided. This cover is adapted to cause an air flow generated by the main rotor to move against the nose of the fuselage. The helicopter will therefore be moving "into the wind." In addition, a rounded cover will provide a positive feed of air to the main rotor. This will increase the rotor's propulsion efficiency. The summation of these effects is a captive helicopter which is more sensitive to control and precise in its movement than would be the case if a rounded cover were not utilized.

In a particularly preferred embodiment, the captive helicopter is enclosed in a spherical cover and the pivot connection of the boom with the pylon is located at the centre of the sphere, the fuselage being disposed close to the inner surface of the cover at all times. It is found that the response of the helicopter to the controls is much improved when this arrangement is provided. The reason for this improvement is not clearly understood. However, it would appear there is a reaction between the cover and the air currents generated by the main rotor.

In a further feature of the invention at least one landing area is provided in the circular track followed by the helicopter in flight. Obstructions, such as miniature trees, may be located adjacent the landing area. Means can be provided to record the successful landings and undesired contacts with the obstructions which take place within a timed period of operation by a user. This record can be translated into a score. The operator develops timing and coordination with practice. His score improves with his greater skill.

DESCRIPTION OF THE DRAWINGS

In the drawings which illustrate an embodiment of the invention:

FIG. 6 is a left side view of the apparatus shown in FIG. 5;

FIG. 7 is a partly sectional, partly broken away side view of the pylon and control apparatus associated therewith;

FIG. 8 is a partly sectional, exploded side view of a portion of the pylon and control apparatus associated therewith;

FIG. 9 is a sectional view of part of the attitude control apparatus;

DETAILED DESCRIPTION

Figure 1:
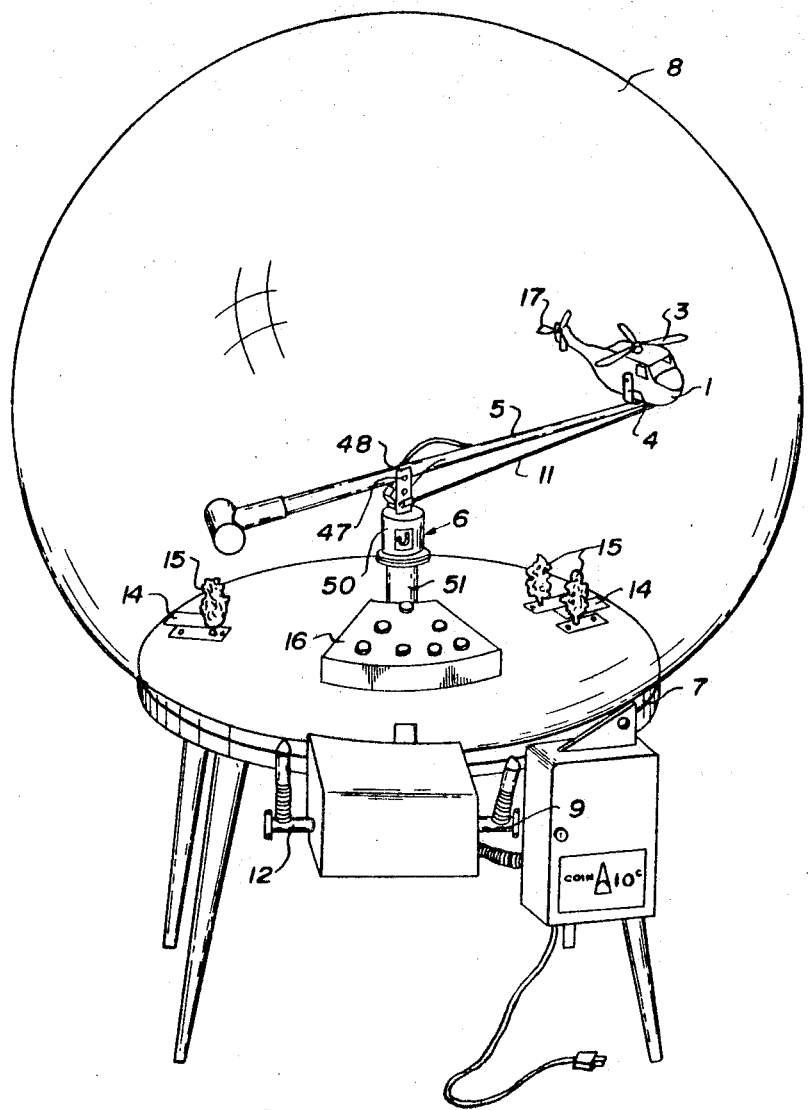
FIG. 1 is a perspective view of the entire device as it would appear when ready for use.
Figure 2:
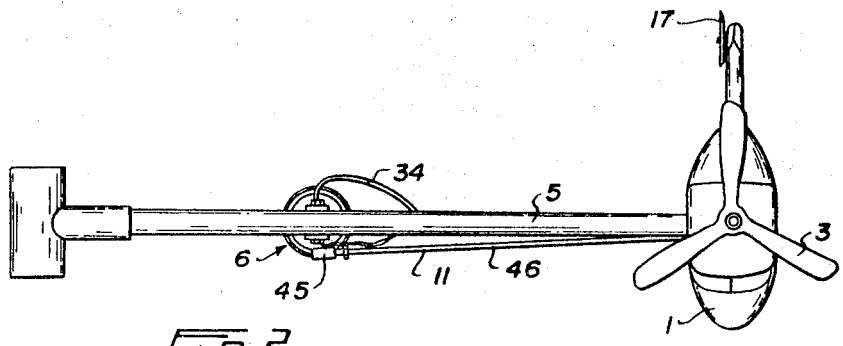
FIG. 2 is a top plan view of the helicopter fuselage, boom and pylon.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention illustrated in the drawings, a helicopter fuselage 1, provided with a motor 2 and a main rotor 3, is shown pivotally mounted in pivot assembly 4. Pivot assembly 4 is itself pivotally mounted on boom 5. Boom 5, in turn, is pivotally and rotatably mounted on pylon 6. Pylon 6 is mounted in an upright position on base member 7 and a safety cover 8 is disposed over the foregoing parts. Control handle 9 actuates a linkage assembly which alters the attitude of main rotor 3 from the horizontal by tilting fuselage 1 about a transverse axis. Connecting rod assembly 11 connects pivot assembly 4 with lug 48 of rotatable member 49 and is adapted to tilt fuselage 1 about an axis parallel to its longitudinal axis to maintain its upright disposition. Control handle 12 actuates an electric power supply system which supplies power to motor 2. Landing pads 14 and obstructions 15 are provided and they may be suitablly connected by circuitry so as to actuate a score keeping panel 16.

Helicopter fuselage 1 is a hollow body made in the likeness of the exterior shape of a conventional helicopter. Fuselage 1 may suitably be made of metal or rigid plastic. A rear rotor 17 is rotatably mounted on the tail portion of fuselage 1. However, rotor 17 plays no part in the mechanical operation of the embodiment. During flight it is rotated by the air blast from the main rotor 3.

Figure 5:
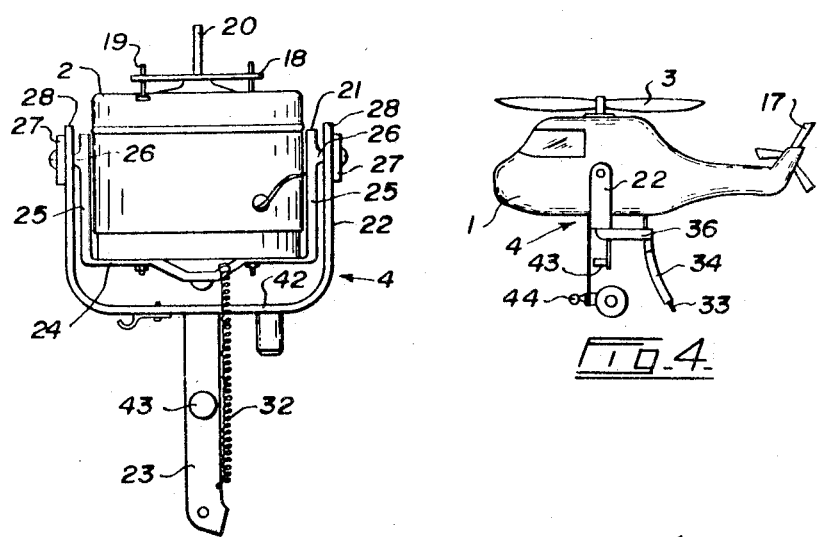
FIG. 5 is a front view of the motor and yoke mounting with the fuselage broken away.
Figure 4:
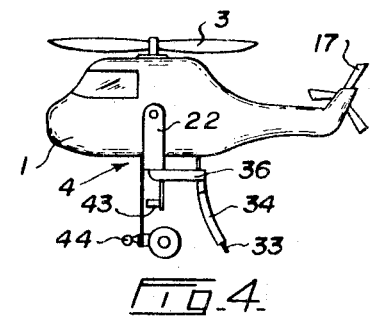
FIG. 4 is a side view of the helicopter fuselage and its mounting.

Looking now at FIGS. 4, 5 and 6, fuselage 1 is shown forming a rigid unit in combination with motor 2 and main rotor 3. Fuselage 1 is secured to mounting plate 18 by suitable means such as screws (not shown) and encloses electric motor 2 which is fixedly suspended from plate 18 by screws 19. A drive shaft 20 from motor 2 extends upwardly through the top of fuselage 1. It is connected to main rotor 3 for rotation thereof.

The output of motor 2 and the design and dimensions of main rotor 3 will, of course, have a bearing on the propulsion power of the device. These are matters of design and choice and will not be reviewed herein.

The rigid fuselage-motor-rotor unit is pivotally mounted in pivot assembly 4. Pivot assembly 4 comprises a pair of inner and outer yokes 21, 22 and a support bracket member 23. As illustrated, motor 2 is fixed to and supported by bottom plate 24, which is an integral segment of inner yoke 21. The arms 25, 25 of inner yoke 21, which extend upwardly from bottom plate 24, carry horizontal stub axles 26, 26 adjacent their upper ends. Stub axles 26, 26 are rotatably mounted in roller bearings 27, 27 mounted in the upright arms 28, 28 of outer yoke 22.

One end of the linkage assembly is connected to the above described structure so as to pivot the rigid unit in its mounting. As shown, a bracket 29 is rigidly attached to one of the upright arms 25 of inner yoke 21. Bracket 29 extends rearwardly from arm 25 and is disposed parallel to the longitudinal axes of fuselage 1. A Bowden cable clevis 30 is attached to the rear end of bracket 29 by loose-fitting machine bolt 31. By virtue of this arrangement a downward pull on clevis 30 will rotate inner yoke 21, and, concurrently, the rigid fuselage-motor-rotor unit about a transverse axis in a clockwise direction.

Means are provided to normally bias the said rigid unit in a counter-clockwise direction. As illustrated, such means may comprise a spring 32 attached at its upper end to the leading edge of bottom plate 24 and at its lower end to the support bracket member 23. Since member 23 is disposed rearwardly from the said leading edge, spring 32 will act to rotate the rigid unit about a transverse axis in the counter-clockwise direction.

Now, the foregoing description describes a particular structure which may be actuated to alter the attitude of the main rotor about a transverse or horizontal axis. This result may be accomplished by any one of several equivalent structures which will be obvious to one skilled in mechanics. For example, the motor and fuselage may be separately mounted on the boom with only the motor adapted to be pivoted about a transverse axis. The end result of this arrangement is the same as that described hereinabove: That is, the attitude of the main rotor is altered so as to control the flight of the device.

The Bowden cable 33, which will be described in greater detail hereinbelow, is encased in the usual flexible casing 34. This casing 34 is fixed at its fuselage end in a casing anchor 35 which will now be described: Anchor 35 comprises a rearwardly extending bracket member 36 having a sleeve 37 formed in its rear end. Bracket member 36 is coplanar with bracket 29. Sleeve 37 is adapted to receive the end of casing 34. A set screw 38 is provided to lock casing 34 within sleeve 37.

The pivot assembly 4 includes support bracket member 23 pivotally mounted on boom 5 to provide for tilting of fuselage 1 about an axis parallel to its longitudinal axis. Support bracket member 23 is U-shaped. It has spaced, vertical front and rear segments 39, 40 which are joined by horizontal segment 41. Segment 41 is suitably secred to the horizontal segment 42 of outer yoke 22. A horizontal pivot pin 43, coplanar with the longitudinal axis of fuselage 1, extends through openings in segments 39, 40. When the device is assembled, pivot pin 43 will extend through a suitable bearing mounted in boom 5 adjacent its end.

A connector rod assembly 11 connects pylon 6 and pivot assembly 4. Rod assembly 11 is adapted to pivot fuselage 1 about a longitudinal axis so as to maintain it in its upright position regardless of the movement of boom 5. More particularly, rod assembly 11 includes ball joint connectors 44, 45 mounted on support bracket member front segment 39 and pylon lug 48. The ends of connector rod 46 are threaded into ball joint connectors 44, 45. Upon movement of boom 5 about its pivot mounting on pylon 6, connector rod 46 acts to tilt fuselage 1 to maintain its upright position.

It will be self-evident that the maintaining of the upright disposition of fuselage 1 may be accomplished using other means than the aforementioned connector rod assembly. For example, fuselage 1 may be freely suspended from the boom 5 using a ball and socket joint.

Boom 5 is pivotally and rotatably mounted intermediate its ends on pylon 6. It is pivoted on horizontal pin 47 which, in turn, is supported at its ends by upright parallel lugs 48. Boom 5 can therefore pivot about a transverse axis and its ends can move up and down in a substantially vertical plane. The rotatable mounting of boom 5 will be described in greater detail hereinbelow.

Attention is now directed to upright pylon 6 which is shown in detail in FIGS. 7, 8 and 9. Pylon 6 includes hollow upper and lower conduit segments 50, 51 which are coaxially connected together by suitable mating flanges and bolts. Lower segment 51 is rigidly mounted on base member 7 by a flange and bolt arrangement.

Member 49 is rotatably mounted in and upon upper conduit segment 50. As shown, a pair of ball bearing races 52, 52 spaced apart by spacer 53, are tightly pressed into upper conduit segment 50. Member 49 includes a flat plate 54 which rests upon upper race 52. Upright parallel lugs 48 are integral with and rise from plate 54. These lugs 48 form the pivot cradle which supports boom 5. A hollow spindle 55 extends downwardly from plate 54. Plate 54 is centrally bored and a sleeve 56 is press fitted therein. Sleeve 56 defines an electric current lead milled slot 57 and a Bowden cable bore 58. Bowden cable 33 and its casing 34 extend from casing anchor 35 through hollow boom 5 to sleeve 56. A ferrule 57A swaged onto the end of casing 34, extends into the upper end 59 of bore 58 and is locked therein by lock screw 60. The lower end 61 of bore 58 is of reduced diameter and is internally threaded. A steel tube 62, sheathed in an insulating coating 63, extends upwardly through bore 64 of spindle 55 and is threaded, at its upper end, into the lower end 61 of bore 58. The bottom end of tube 62 extends below the bottom of spindle 55 and is centered therein by bushing 65 which is press fitted into the end of spindle 55. Mounted on the protruding end of tube 62 are an upper insulating washer 66, an upper conductive ring 67, an intermediate insulating washer 68, a lower conductive ring 69, a lower insulating washer 70, a metal retaining washer 71 and a lock nut 72. These items are slipped and threaded onto the bottom end of tube 62. The function of the conducting ring will be explained hereinbelow.

A lock nut 72A threads onto the bottom of spindle 55 to lock bearing races 52, 52 into place.

Figure 3:
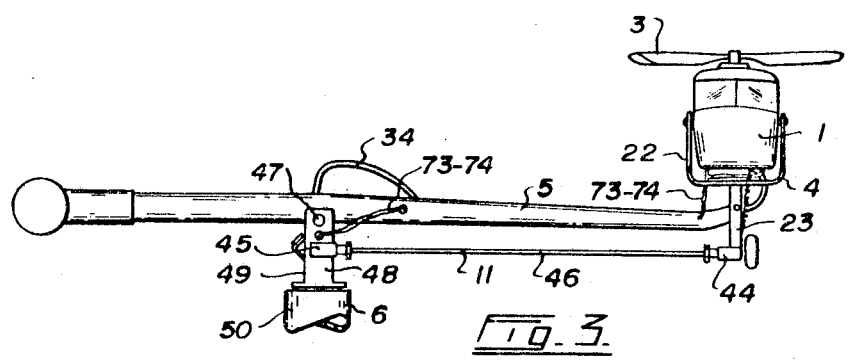
FIG. 3 is a front side view of the apparatus shown in FIG. 2.

Now, a pair of electric current leads 73, 74 connect motor 2 and conductive rings 67, 69. As shown in FIGS. 3 and 8, leads 73, 74 extend inside boom 5 to milled slot 57 in sleeve 56. From this point they extend downwardly through milled slot 57 and 64. Lead 73 extends through washer 66 and is secured in conductive ring 67. Lead 74 extends through washer 66, ring 67 and washer 68 and is secured in conductive ring 69.

Carbon brushes 75, 76 are mounted in the wall of lower conduit segment 51 and are in continuous contact with conductive rings 67, 69 respectively. Power leads 77 supply current to the brushes 75, 76.

By virtue of the above described rotating electric connection assembly, electric current can be continually supplied to motor 2 from a suitable power source.

The amount of current supplied to motor 2 is regulated by rheostat 78 (not shown) which is connected into the power lead intermediate the power source and the rotating electric connection assembly. Rheostat 78 is, in turn, controlled by the movement of control lever 12.

Turning now to completing the description of the linkage means for tilting fuselage 1 about a transverse axis, a stiffened extension 81 of Bowden cable 33 extends downwardly through bore 82 of tube 62 and is anchored at its lower end in linkage connection 83. Linkage connection 83 is shown in detail in FIG. 9. It includes an anchor member 84 in which the lower end of stiffened extension 81 is fixed by a lock screw 85. Anchor member 84 is rotatably mounted in ball bearing race 86 which is secured to the upper end of push rod 87 by cap 88. A pin 89 locks cap 88 in place. A lock nut 84A locks anchor member 84 in place.

Linkage connection 83 serves to transmit the longitudinal movement of push rod 87 to Bowden cable 33 while leaving the cable free to rotate with boom 5.

Figure 10:
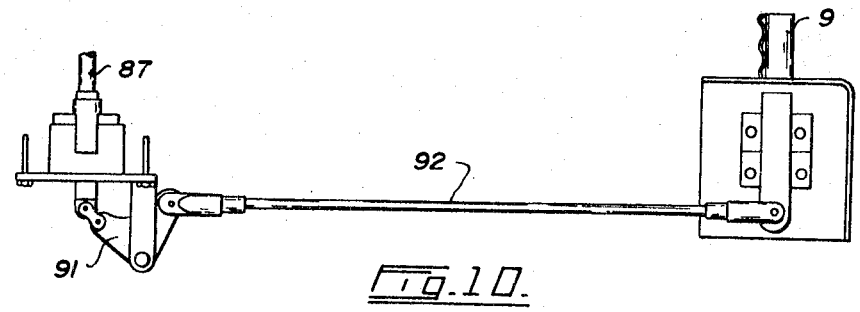
FIG. 10 is a side view of part of the attitude control mechanism.
Figure 11:
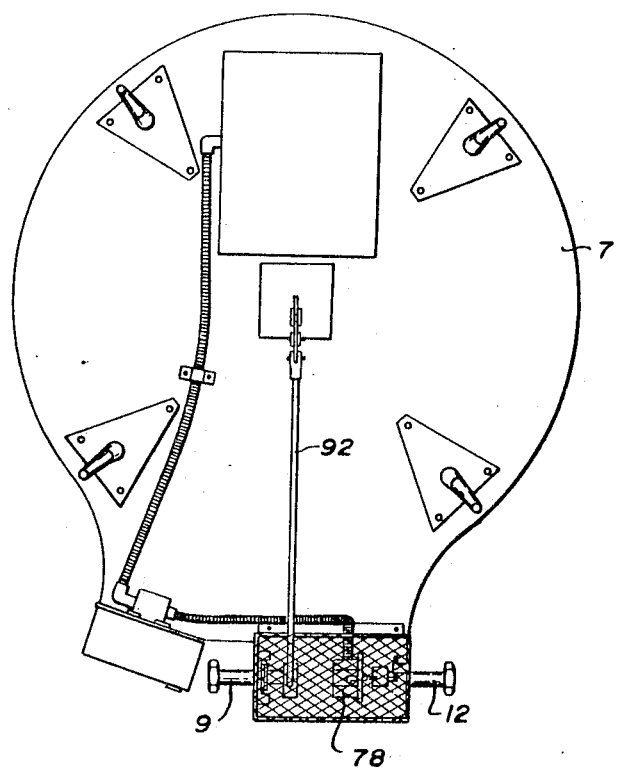
FIG. 11 is a plan view of the bottom of the entire device shown in FIG. 1.

Push rod 87 forms part of a linkage assembly, shown in FIG. 10, which is adapted to convert the movement of a handle lever 9 into longitudinal movement of the Bowden cable 33 with resultant tilting of fuselage 1. As shown, the lower end of upright push rod 87 is connected through pivotally mounted bell crank 91 to horizontal push rod 92. Horizontal push rod 92 is connected to and actuated by lever 9. As a result of this construction, a pull on lever 9 will result in tilting of fuselage 1 in a clockwise direction, against the action of spring 32.

A mechanical linkage for tilting fuselage 1 has been described. There are, of course, mechanical equivalents which might be substituted for this assembly. For example, a hydrokinetic assembly could be used. Such an assembly could include: A first hydraulic cylinder activated by the user; a line of plastic tubing, provided with suitable rotary connections, connecting the cylinder with a second hydraulic cylinder adapted to tilt the main rotor from horizontal; and, a spring adapted to reverse the movement of the second cylinder whereby it would be returned to the non-tilted position when the first cylinder was released.

As shown in FIG. 1, a safety cover 8 is provided. Cover 8 is necessary to prevent injury by the main rotor 3 to curious children and the like. It is self-evident that cover 8 could be made in any number of different shapes and of different materials. For example, it may only partially cover the fuselage 1 and boom 5 and it may be entirely transparent or only partly so.

We have found that one particular form of cover 8 is preferable. This particular cover is rounded in shape. Cover 8 should be adapted to direct a portion of the slipstream generated by main rotor 3 toward the leading end of the moving fuselage 1. If a rounded cover is supplied and fuselage 1 is in a nose down attitude and is moving forwardly, a substantial portion of the slipstream will be directed by the cover back around the fuselage nose. This has a pronounced and beneficial effect on the handling characteristics of the helicopter since it is always moving "into the wind." A rounded cover 8 has the additional advantage of directing some of the slipstream directly into the main rotor 3. Increased efficiency of the rotor 3 is thereby derived from this form of forced feeding.

In the particularly preferred emobdiment shown, cover 8 is sperical in form and pivot pin 43 is located substantially at the centre of the sphere. Fuselage 1 is located so that the outer edge of main rotor 3 is about one inch from cover 8. The handling characteristics of the device are much improved when this arrangement is used, than would otherwise be the case.

As a means for testing the user's skill, a series of landing pads 14 may be spaced at intervals along the path of flight. The user will be expected to land fuselage 1 precisely on the pads 14. If desired, obstructions 15 may be provided adjacent pads 14 to make landing and take-off more difficult. A scorekeeping panel 16 can be provided to record the performance of the user. Circuits for actuating the scorekeeping panel 16 in response to signals from the landing pads 14 and obstructions 15 can easily be designed and installed by those skilled in the electrical art. Such circuits will not be described herein.

In operation, electrical current is fed through the power supply system to motor 2 of a grounded fuselage 1. As the amount of current is increased through adjustment of rheostat 78, a horizontal main rotor 3 will rotate with increased speed and gradually lift fuselage 1 vertically, boom 5 simultaneously pivoting on pin 43. Spring 32 will tend to tilt fuselage 1 to a nose down position; the user will control this movement by movement of the linkage assembly. By gradually letting out the linkage assembly, fuselage 1 can be tilted to a nose down position and will commence flying forward. Its movement is of course limited by the rotatable boom 5 which, in effect, acts as a tether for fuselage 1. The forward motion of fuselage 1 can be checked by drawing in the linkage assembly and tilting fuselage 1 to a tail down position. Practice with the controls will soon enable one to fly, hover and land the helicopter with accuracy. Fuselage 1 is of course maintained in an upright position at all times, irregardless of the vertical movement of boom 5, by connector rod assembly 11.

What I claim as my invention is:

1. A captive helicopter device for simulating the flight of a helicopter comprising, in combination:
   (a) a helicopter fuselage provided with a motor and a main rotor adapted to be rotated by the motor, said rotor being further adapted to be tiltable about a horizontal axis;
   (b) a boom carrying the fuselage in an upright position adjacent one end thereof;
   (c) a pylon upon which the boom is pivotally and rotatably mounted;
   (d) the fuselage being pivotally mounted on the boom and adapted to be tilted about an axis parallel to the longitudinal axis of the fuselage upon pivoting movement of the boom so as to maintain the fuselage in an upright position at all times;

(e) a spherical safety cover, enclosing the fuselage boom and pylon, the pivot connection of the boom to pylon being located substantially at the centre of the sphere and the length of the boom being such that the fuselage is always adjacent the inner surface of the cover;

(f) means, operable from outside the cover, routed along the pylon and boom, adapted to vary the lifting power of the main rotor; and (g) means, operable from outside the cover, routed along the pylon and boom, adapted to vary the attitude of the main rotor from horizontal.

2. A captive helicolpter device for simulating the flight of a helicopter comprising, in combination:

(a) a helicopter fuselage having an electric motor, integral therewith, and a main rotor adapted to be rotated by the motor;

(b) a boom carrying the fuselage-motor-rotor unit in an upright position adjacent one end thereof, the unit being pivotally mounted in a pivot assembly for movement about a transverse axis, the pivot assembly being pivotally mounted on the boom whereby the unit may be pivoted about an axis parallel to the longitudinal axis of the fuselage;

(c) a pylon upon which the boom is mounted intermediate its ends in substantially balanced arrrangement, the boom being pivotally mounted for movement about a transverse axis on a rotatable member carried by the pylon;

(d) means connecting the rotatable member and the unit, adapted to pivot the unit about an axis parallel to the longitudinal axis of the fuselage;

(e) a transparent, spherical cover enclosing the unit, boom and pylon, the pivot connection of boom to pylon being located substantially at the centre of the sphere and the length of the boom being such that the fuselage is always adjacent the inner surface of the cover;

(f) a linkage assembly, operable from outside the cover, routed along the pylon and boom, said assembly connected to the unit and adapted to pivot it about a transverse axis in one direction;

(g) means adapted to normally pivot the unit in the opposite direction from that occasioned by the linkage assembly;

(h) a power supply system, routed along the pylon and boom, connecting the motor with a source of electric current; and (i) means, operable from outside the cover, connected to the power supply system, adapted to vary the amount of current supplied through the power supply system to vary the speed of the motor and hence the speed of rotation of the main rotor.

References Cited

UNITED STATES PATENTS

| | | |
|---|---|---|
| 2,775,453 | 12/1956 | Biller. |
| 2,942,880 | 6/1960 | Bennett. |
| 3,141,668 | 7/1964 | Nicholson. |
| 3,383,110 | 5/1968 | Brown. |

FOREIGN PATENTS 499,330   11/1954   Italy.

RICHARD C. PINKHAM, Primary Examiner

M. R. PAGE, Assistant Examiner

U.S. Cl. X.R.

273—95